United States Patent [19]

Dyner

[11] 4,287,067

[45] Sep. 1, 1981

[54] WATER FILTER FOR RADIATORS

[75] Inventor: Moises Dyner, Buenos Aires, Argentina

[73] Assignee: Marcos Berstein, Buenos Aires, Argentina

[21] Appl. No.: 118,341

[22] Filed: Feb. 4, 1980

[30] Foreign Application Priority Data

Feb. 2, 1979 [AR] Argentina .............................. 275435

[51] Int. Cl.³ .......................................... B01D 29/04
[52] U.S. Cl. .................................. 210/487; 165/119; 210/497.01; 210/499
[58] Field of Search ................. 165/119; 210/315, 483, 210/484, 486, 489, 492, 497 R, 499, 487, 497.01

[56] References Cited

U.S. PATENT DOCUMENTS

| 56,836 | 7/1866 | Turrell et al. | 210/499 |
| 1,458,464 | 6/1923 | Byers | 210/499 |
| 1,731,085 | 10/1929 | Warren | 210/499 |
| 1,922,863 | 8/1933 | Rendelman et al. | 165/119 |
| 1,933,409 | 10/1933 | Berman | 165/119 |
| 3,731,815 | 5/1973 | Collingwood et al. | 210/499 |

*Primary Examiner*—Ivars C. Cintins
*Attorney, Agent, or Firm*—Allison C. Collard; Thomas M. Galgano

[57] ABSTRACT

A water filter for radiators is provided which is characterized by the fact that it is fitted with a thick internal cylindrical mesh inserted into another cylindrical mesh similar to the foregoing but with a finer mesh. Both meshes are fixed by supports placed by pressure between both means and a coupling flange.

1 Claim, 2 Drawing Figures

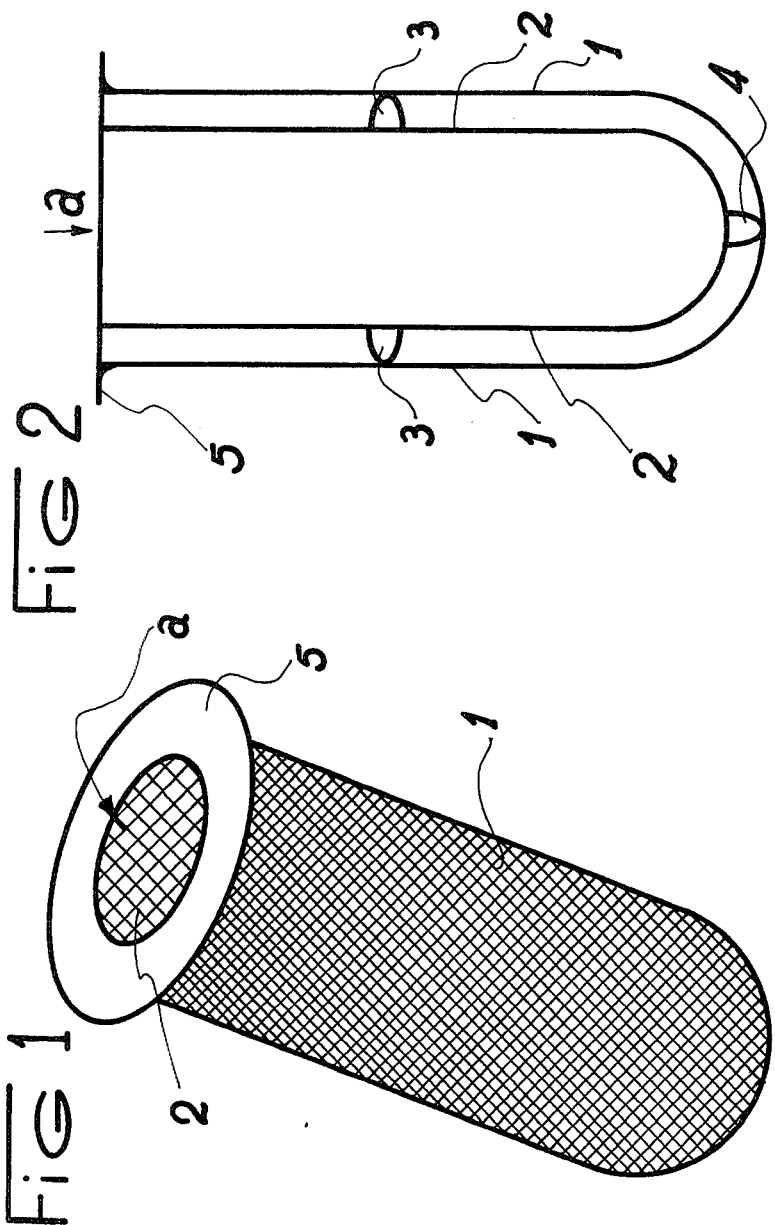

WATER FILTER FOR RADIATORS

The present invention relates to a water filter for radiators, especially automobile radiators.

More particularly, the present invention provides a water filter for radiators which includes a generally cylindrical external filter screen having a relatively fine mesh width and an open end, and a generally cylindrical internal filter screen having a relatively larger mesh width than that of the external filter screen. The internal filter is disposed within the external filter and it too has an open end. Support means are disposed between the filters for maintaining them in a fixed, spaced-apart relationship to one another, and a coupling flange is disposed across and joins together the open ends of the screens.

The technical advantages achieved by the above-mentioned filter are the result of observations, tests and experiments carried out with the fundamental object to find a truly integral technical solution for certain problems and difficulties observed in radiators and cooling systems caused by the accumulation of incrustations, rust, etc., and to the difficulties encountered to eliminate the same or at least prevent their interference in the correct and normal operation of a water-cooled engine.

The filter of the invention is particularly applicable to the water fed cooling systems for the different types of engines that are supplied with a water pump, and which have the capacity to circulate the water from the radiator through a filter for its adequate purification.

Other objects and features of the present invention will become apparent from the following detailed description, considered in connection with the accompanying drawing, which discloses a single embodiment of the invention. It is to be understood, however, that the drawing is designed for the purpose of illustration only, and not as a definition of the limits of the invention.

In the drawing, wherein similar reference characters denote similar elements throughout the several views:

FIG. 1 is a schematically illustrated perspective view of a filter embodying the present invention, as seen from the top end or inlet opening; and FIG. 2 is a longitudinal cross-sectional view of the filter shown in FIG. 1.

Referring now in detail to the drawing, a water filter for radiators embodying the present invention is illustrated which is composed of a cup-shaped, mesh or fine filtering external screen 1, internally of which is disposed another mesh or filtering screen 2 of similar cylindrical shape but having a larger mesh width than the mesh mentioned above. Fine filtering screen 1 is fixed to filtering screen 2 by means of side pressure supports 3, and one support 4 on the base of the filter for a correct adjustment and easy fixing. Furthermore, on the top portion or inlet opening of screens 1 and 2, flange 5 is attached which serves as a support in the radiator inlet.

In FIG. 1 of the attached drawing, the complete filter may be observed, correctly designed for placement in the circulation opening of the radiator. The filter is held in place by flange 5, so as to establish the stability of the filter with the water circulation passage.

FIG. 2 illustrates a longitudinal sectional view of the filtering elements showing the correct disposition for the natural water passage and thus the retention of foreign matter. In particular, the water to be filtered is filtered first by the thick network or wide mesh of screen 2 which is separated from the next filter 1 by supports 3 and 4. The partially filtered water then begins a new passage and further purification through another mesh of screen 1 of a finer network or mesh than that of screen 2.

With reference to its practical fitting, and in accordance with that illustrated in FIGS. 1 and 2 of the attached drawing, the access opening of the filter is inserted in the inlet of the radiator and is fixed therein by flange 5; this being the ideal location for the retention of foreign matter in the water, as it is the natural opening to the circulation circuit of the engine cooling system liquid that is driven by a complementary pump. As noted above, the water initially passes through the first filter or mesh 2 which retains most of the foreign matter in the water, as the same is of a very fine network. Subsequently, the water passes through another mesh or screen 1, with a still finer mesh, where even the most minute foreign matter is retained which was not retained by the preceding screen. In this way a perfect operation of the engine cooling system is obtained, and simultaneously the damage caused by incrustations, rust, etc., and the consequent overheating of the engine is avoided.

This water filter as may be observed is easily fitted, is simple and of an easy assembly, with materials that offer great efficiency and low manufacturing costs.

Besides the foregoing, it is doubtless that in putting the present invention into practice, some modifications may be introduced as regards certain details, without this involving a departure from the basic principles which are clearly specified in the following claims.

Thus, while only a single embodiment of the present invention has been shown and described, it will be obvious that many modifications and changes may be made thereunto, without departing from the spirit and scope of the invention.

What is claimed is:

1. An automobile radiator water filter comprising:
   a generally cup-shaped external filter screen having a generally cylindrical sidewall and a generally hemispherical base wall and having a relatively fine mesh width and an open end;
   a generally cup-shaped internal filter screen having a generally cylindrical sidewall and a generally hemispherical base wall and having a relatively larger mesh width than that of said external filter screen, said internal filter being disposed within said external filter and having an open end;
   support means disposed between said screens for maintaining them in a fixed, spaced-apart relationship to one another, said support means including side supports disposed between the sidewalls of said screens and a base support disposed between the base walls of said screens; and
   a flat, annular coupling flange disposed across and joining together the open ends of said screens, said flange having an annular lip projecting laterally beyond the open end of said external screen which serves to mount said filter in a radiator inlet.

* * * * *